(12) United States Patent
Liermann et al.

(10) Patent No.: US 7,766,729 B2
(45) Date of Patent: Aug. 3, 2010

(54) SMOKING RAIL FEED MEANS AND METHOD OF ACCURATELY FEEDING THE SAME

(75) Inventors: Torsten Liermann, Laupheim (DE); Benjamin Abele, Waldstetten (DE); Steffen Mayer, Rutesheim (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 225 days.

(21) Appl. No.: 12/108,777

(22) Filed: Apr. 24, 2008

(65) Prior Publication Data
US 2009/0047885 A1 Feb. 19, 2009

(30) Foreign Application Priority Data
Apr. 25, 2007 (EP) .................. 07008433

(51) Int. Cl.
*A22C 11/00* (2006.01)
(52) U.S. Cl. ..................................... 452/51
(58) Field of Classification Search ............. 452/30–35, 452/37, 46–48, 51
See application file for complete search history.

(56) References Cited

U.S. PATENT DOCUMENTS

| 2,616,572 | A |   | 11/1952 | McLaughlin |
|---|---|---|---|---|
| 4,494,276 | A |   | 1/1985 | Trottmann |
| 4,547,931 | A | * | 10/1985 | Staudenrausch et al. ...... 452/51 |
| 4,880,105 | A |   | 11/1989 | Kasai et al. |
| 6,254,470 | B1 | * | 7/2001 | Burke .......................... 452/123 |
| 6,409,460 | B1 |   | 6/2002 | Leining |
| 6,786,321 | B2 |   | 9/2004 | Borkiewicz et al. |
| 6,855,047 | B2 | * | 2/2005 | Shefet et al. .................. 452/32 |
| 7,255,638 | B2 | * | 8/2007 | Stimpfl ........................ 452/32 |
| 7,357,953 | B1 | * | 4/2008 | Van Den Dungen et al. 426/465 |
| 7,563,158 | B2 | * | 7/2009 | Haschke ...................... 452/141 |
| 2005/0159093 | A1 |   | 7/2005 | Kasai |

FOREIGN PATENT DOCUMENTS

| DE | 3206956 | A1 | 9/1982 |
|---|---|---|---|
| DE | 3635412 | A1 | 4/1987 |
| DE | 3806467 | C1 | 5/1989 |
| DE | 10340632 | B3 | 12/2004 |
| EP | 0 107 148 | B1 | 8/1986 |
| EP | 0 179 528 | B1 | 1/1990 |

OTHER PUBLICATIONS

European Search Report based on European Patent EP 07 008433; Date of Mailing Jun. 28, 2007.

* cited by examiner

*Primary Examiner*—Thomas Price
(74) *Attorney, Agent, or Firm*—Marshall, Gerstein & Borun LLP

(57) ABSTRACT

A smoking rail feed device as well as a method of accurately positioning a smoking rail in sausage loops or in loops of other products suspended from a hanger, and having, for improved insertion of the smoking rail into the loops, a smoking rail support, on which the smoking rail rests, at least partially, and oriented in the direction of the hanger. The smoking rail support is adapted to be displaced such that the smoking rail is transferred substantially in the longitudinal direction from the smoking rail feed device to a pick-up area of the hanger, in which the loops are arranged for being picked up.

16 Claims, 6 Drawing Sheets

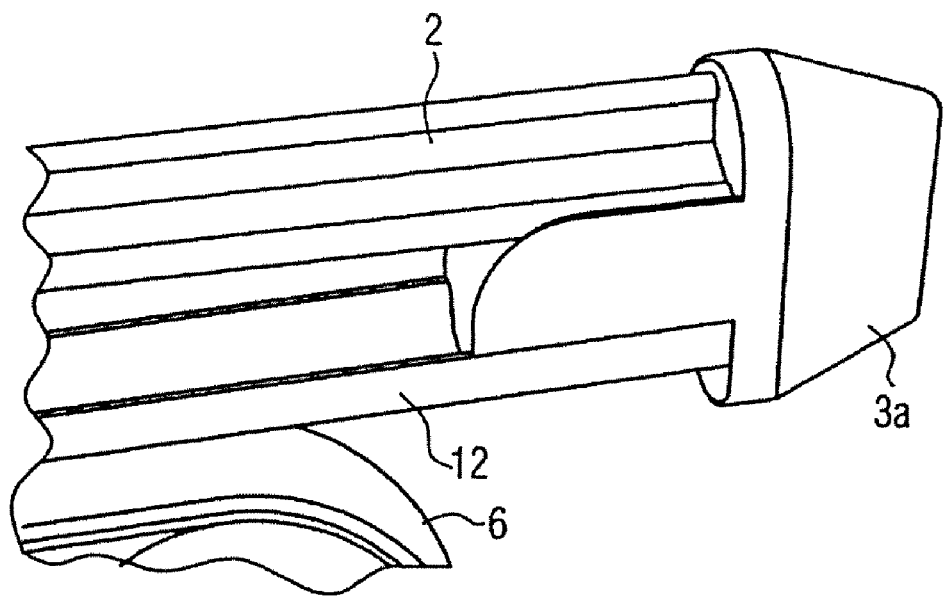
FIG. 5
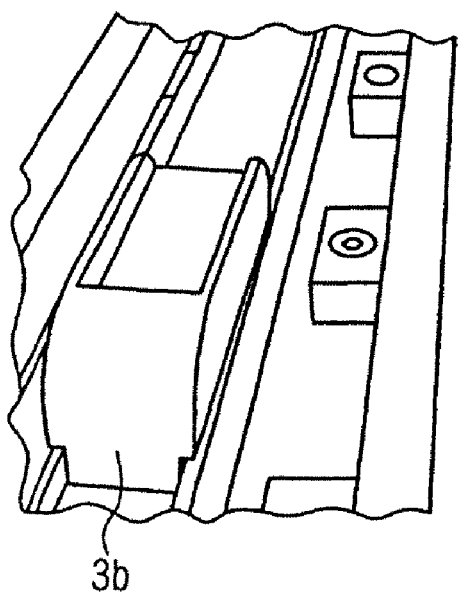 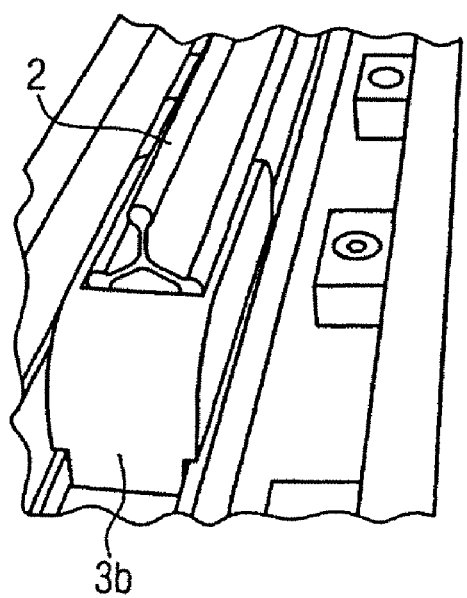
FIG. 6a  FIG. 6b

SMOKING RAIL FEED MEANS AND METHOD OF ACCURATELY FEEDING THE SAME

CROSS-REFERENCE TO RELATED APPLICATION

The present application claims the benefit of priority of European Patent Application No. EP 07 008 433.0, filed Apr. 25, 2007. The entire text of the priority application is incorporated herein by reference in its entirety.

FIELD OF THE DISCLOSURES

The present disclosure relates to a smoking rail feed means as well as to a method of accurately feeding a smoking rail, such as used in sausage production operations.

BACKGROUND

In industrial sausage production processes, stuffed sausage chains are normally automatically suspended in the form of loops by means of a hanger. The term sausage chains or sausage loops stands here for a connected accumulation of individual portions and also for continuously stuffed, undivided sausage strands. The sausage loops are held e.g. by reception hooks. Subsequently, the sausages are pushed onto a smoking rail by hand. This smoking rail is then hung in a smoking trolley by the operator. The smoking trolley, in turn, is then moved into a smoking chamber. The diversity of different smoking rails, smoking trolleys and sausage products makes it much more difficult to automate the loading of smoking rails and smoking trolleys. Hence, automated systems have not been used up to now. Alternatively to this course of action, there are also facilities which smoke the products in a continuous cycle and which are used instead of the smoking chambers. In view of the simpler conditions that have to be fulfilled for automating continuous facilities, automated systems for loading and unloading these facilities are here already used.

In the case of particularly simple sausage products in synthetic sausage casings and in the case of certain applications, subprocesses have already been simplified and semi-automated. For example, systems are known which allow smoking rails to be removed, one at a time, from a pile of smoking rails. Systems used for threading the smoking rails into the smoking rail hanger by means of gripping technology are known in connection with continuous facilities.

These systems consist of two gripping modules; the first one takes hold of the smoking rail at one end thereof. In the next operating step, a manipulating system or a robot introduces the smoking rail into the hanger. In the next operating cycle, the robot moves the second gripping module up to the smoking rail and takes hold of the other end of said smoking rail. The robot is thus able to remove the smoking rail together with the products from the hanger. Fast cycle times cannot be achieved by means of this system. In addition, the sausages must be very uniform in shape and must be suspended such that a free space for introducing the smoking rail is formed. In view of the fact that the gripping module must take the smoking rails from a conveyor belt and must thread them through the spaces between the sausage chain, this handling takes much time which the robot lacks for its actual task, viz. conveying the laden smoking rails e.g. to a smoking trolley. In addition, it is difficult to thread the smoking rail through the sausage loops, since, during such threading, the smoking rail is held by only one gripper so that it will hang down.

Another system which is already known is a manual system in the case of which smoking rails are arranged in a horizontal orientation on a vertically disposed turntable, the sausage loops being seized by the smoking rail and removed from the hooks of the hanger by manually rotating the turntable. This system could not gain acceptance on the market, since it did not allow a reduction of the personnel expenditure on the part of the operating company.

SUMMARY OF DISCLOSURE

Taking this as a basis, it is the object of the present disclosure to provide a smoking rail feed means as well as a corresponding method, which allow an exact, fast, accurate and careful introduction of the smoking rails into the sausage loops.

Disclosure The present disclosure provides a smoking rail feed means which allows accurate positioning of a smoking rail in sausage loops or in loops of other products suspended from a hanger. According to the present disclosure the smoking rail feed means comprises a smoking rail support on which the smoking rail rests, at least partially, and is oriented in the direction of the hanger. According to the present disclosure said smoking rail support is adapted to be displaced such that the smoking rail can be transferred substantially in the longitudinal direction from the smoking rail feed means to a pick-up area of the hanger. The pick-up area of the hanger is the area in which the loops are arranged for being picked up. Due to the fact that the smoking rail rests on the smoking rail support which, in turn, is moved into the hanger, the smoking rail will always be oriented correctly and can be moved by simply displacing the support.

The smoking rail can then be raised and removed together with the loops. The removal can take place e.g. via a robot with suitable gripping means. The handling time for the robot or the manipulator is reduced by decoupling the smoking rail insertion process from the robot.

According to a preferred embodiment of the present disclosure, the support is implemented as part of a smoking rail insertion unit, said smoking rail insertion unit being adapted to be moved, together with the smoking rail, out of the smoking rail feed means and into the pick-up area. Due to the fact that the smoking rail rests on the support in the smoking rail insertion unit, the smoking rail can accurately be displaced in a particularly stable manner.

It will be particularly advantageous, when the support is implemented as at least one replaceable element that is held in said smoking rail insertion unit. When different types of smoking rails and geometries are used, it will thus suffice to replace the respective support element or elements which are adapted to the size and the shape of the smoking rail in question. This can be done by simply introducing or inserting the support elements. Hence, simple and fast retrofitting will be guaranteed.

According to an advantageous embodiment, the front end of the insertion unit, i.e. the end facing the hanger, is provided with an integrated guide tip. Due to the fact that a tip is formed on the front end, the smoking rail, together with the smoking rail insertion unit, can easily be threaded through the loops without damaging them. Such easy threading will be possible even in the case of closely spaced loops. In view of the fact that the guide tip is provided on the insertion unit, it will remain there, when the smoking rail is removed for further process steps. The process steps of attaching a guide tip to a smoking rail and of removing it later on can thus be dispensed with. The guide tip will therefore be available for the next smoking rail introduced into the smoking rail feed means.

It will be particularly advantageous when the support element is implemented as an integrated guide tip.

In particular, the support can be implemented such that the smoking rail is encompassed thereby at least partially on its sides and on its front end, which faces the hanger. This has the effect that the smoking rail will be held on its sides and towards the front and that it will be oriented exactly.

The support and the smoking rail insertion unit, respectively, can be moved through a motor-driven drive means. This allows easy automation. The principle according to the present disclosure allows, however, also a safe manual insertion via the movable support.

According to the present disclosure, the smoking rail, when moving, can remain in a position in which it is oriented in a defined, substantially horizontal plane.

It will be advantageous when the smoking rail feed means additionally comprises a lifting means, which, in the transferred position of the smoking rail, raises said smoking rail and/or displaces it to the side. Due to the integrated lifting function, the laden smoking rails can be removed more easily.

In view of the fact that, in the case of the method according to the present disclosure, the smoking rail rests on a smoking rail support and is aligned with respect to the hanger, the smoking rail can accurately be moved into the pick-up area of the hanger.

The hanger conveys the products, which are suspended in the form of loops, into the pick-up area e.g. via hooks. According to the present disclosure, it proved to be particularly advantageous when the smoking rail is first introduced in the pick-up area of the hanger with the aid of the support at a moment in time at which loops have not yet been conveyed into said pick-up area by the hanger. As soon as the smoking rail has been positioned correctly, the loops are conveyed by the hanger into the pick-up area and across the smoking rail. It is, however, also possible to first convey the products suspended in the form of loops into the pick-up area and to then introduce the smoking rail into the loops.

As soon as the smoking rail has been positioned in the loops, the smoking rail is raised and the laden smoking rail is guided to a smoking rail rack. The smoking rail rack can, for example, be part of a smoking trolley, etc. used for treating the sausage loops subsequently.

By decoupling the smoking rail feed and removal operations, a subsequent smoking rail can already be introduced in the hanger while the preceding smoking rail is still being transferred to the smoking rail rack. This will save precious process time. It will be advantageous to synchronize the movement of the support with the conveying movement of the hanger.

According to the present disclosure, the smoking rail, when moving into the pick-up area of the hanger, can remain in a position in which it is oriented in a defined, substantially horizontal plane.

BRIEF DESCRIPTION OF THE DRAWINGS

Making reference to the following figures, the present disclosure will be explained in more detail hereinbelow.

FIG. 5 shows schematically, in a perspective view, a front end of a smoking rail inserted in the smoking rail insertion unit.

FIG. 6A shows, in a perspective view, the end of a smoking rail insertion unit which faces away from the hanger, without any smoking rail.

FIG. 6B shows the smoking rail insertion unit shown in FIG. 6A, with a smoking rail.

DETAILED DESCRIPTION

Figure 1:
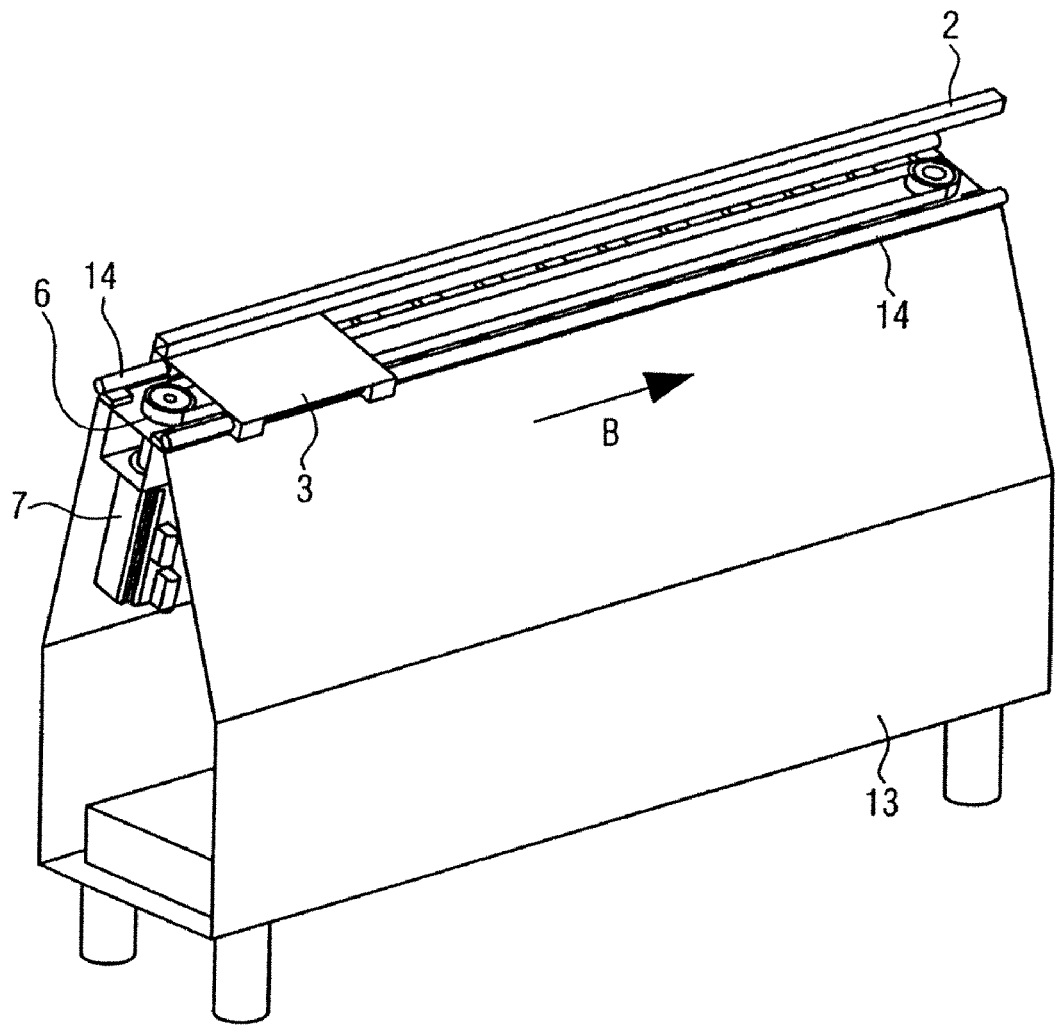
FIG. 1 shows schematically the essential parts of a possible embodiment of a smoking rail feed means according to the present disclosure.
Figure 2:
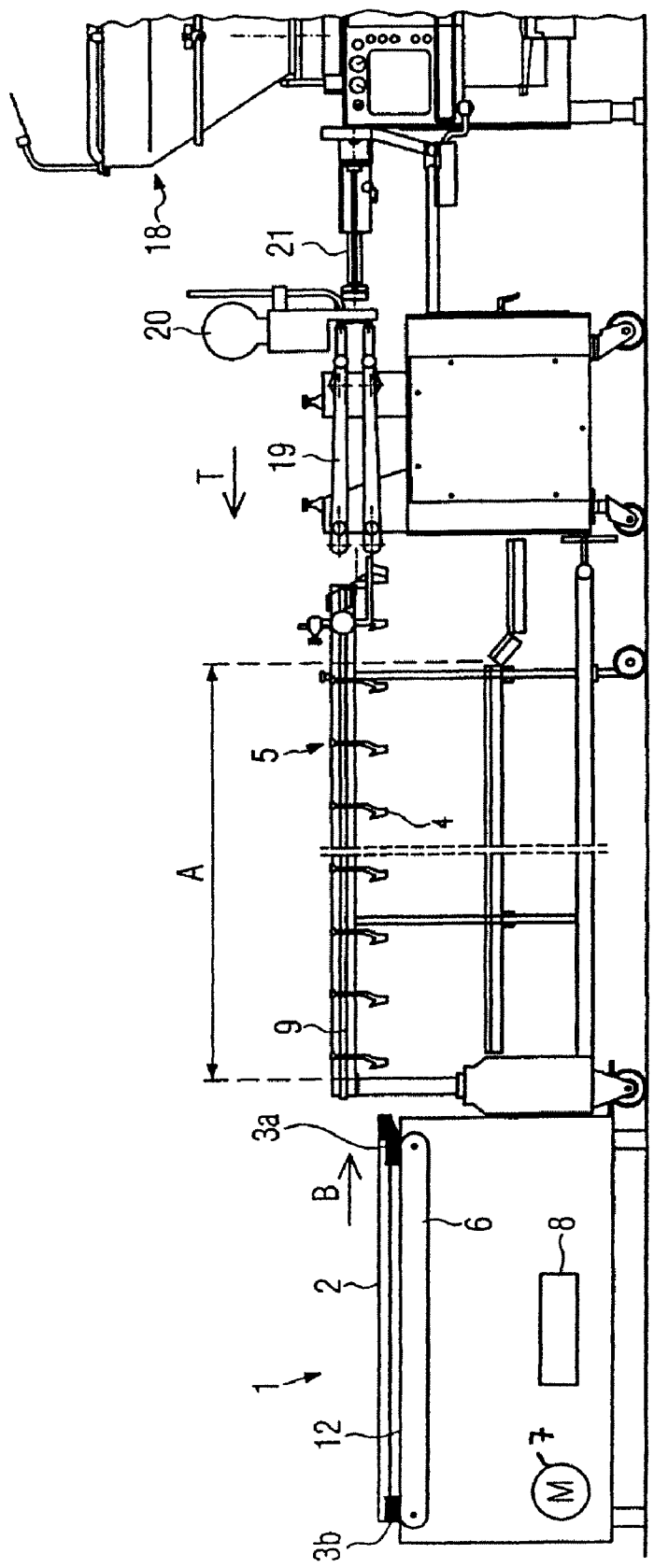
FIG. 2 shows schematically a side view of a smoking rail feed means according to the present disclosure, which is coupled to a hanger.
Figure 3:
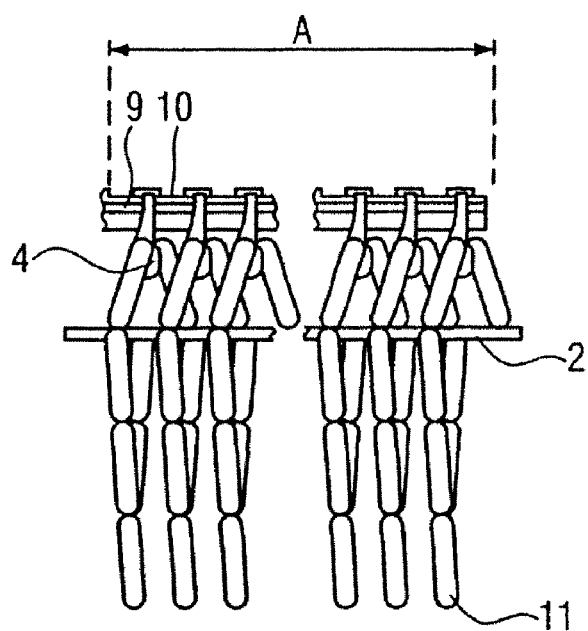
FIG. 3 shows schematically a side view of sausage loops into which a smoking rail has been inserted.

FIG. 1 shows in a perspective representation the components of a smoking rail feed means 1 according to the present disclosure. As can be seen from FIG. 1, the smoking rail feed means 1 according to the present disclosure comprises a housing 13 whose upper end has provided thereon a smoking rail support 3; a smoking rail 2 rests on this smoking rail support 3 and is oriented in the direction of a hanger 5, as will be described hereinbelow in connection with FIG. 2. Neither orientation means nor holding means are here shown. The smoking rail support 3 is here implemented as a mobile carriage, which runs in guide means 14 and which is adapted to be moved in the direction of arrow B or in a direction opposite thereto through drive means 6 consisting of a drive belt in the present case. The drive means 6 is driven through the motor 7. By moving the support 3 in direction B, i.e. in the direction of a hanger 5 from which loops of sausages or loops 11 of other products are suspended, the smoking rail 2 is introduced in the hanger 5. It would also be possible to displace the carriage 3 manually in the guide means 14 in the direction of arrow B and in a direction opposite thereto. The smoking rail feed means 1 shown in FIG. 1 allows fast automatic feeding of a smoking rail into a pick-up area A of the hanger 5 in which the loops 11 are arranged for being picked up. The smoking rail 2, when executing its movement, is oriented in a defined essentially horizontal plane. FIG. 3 shows a smoking rail 2 which has been introduced in the loops 11.

Figure 4:
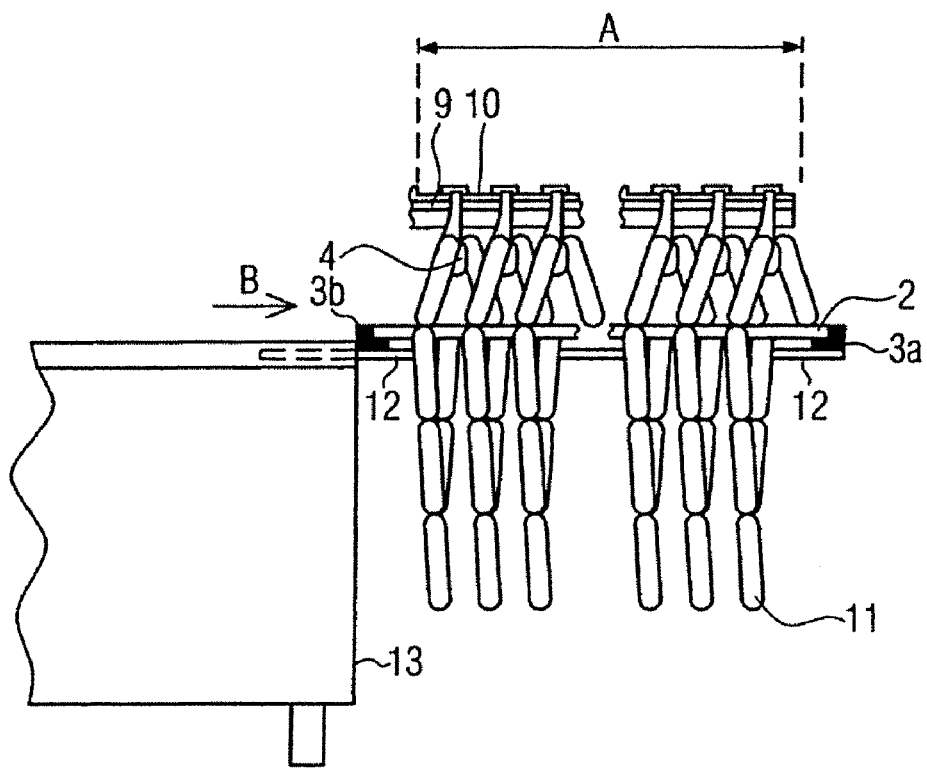
FIG. 4 shows schematically a side view of sausages suspended in the form of loops into which the smoking rail, together with the smoking rail insertion unit, has been inserted.

A preferred embodiment of the present disclosure will be explained in detail hereinbelow in connection with FIG. 2. FIG. 2 shows the conventional components of a stuffer for stuffing sausage casings with a pasty mass. A stuffing machine comprises, in the manner known, a hopper 18 as well as a stuffing tube 21 through which the pasty mass is stuffed into the sausage casing. It is either possible to produce a continuous strand or to subdivide the sausage strand produced into individual sausages by means of a twist-off unit or a clip module 20. Via a conveyor 19—which is here defined by two opposed, circulating conveyor belts—the stuffed sausage strand is conveyed to a hanger 5, said sausage strand being, in the manner known, suspended in the form of loops 11 from suspension hooks 4, as can especially be seen in FIGS. 3 and 4. The suspension hooks 4 are guided in a guide 10 and are circulatorily driven via a driving element 9, e.g. a toothed belt or a chain, with the aid of a motor that is not shown. The loops 11 suspended from the hooks 4 are thus conveyed by the hanger 5 into a pick-up area A of the hanger 5 where the loops 11 are to be picked up by a smoking rail 2 introduced in said loops.

When seen in the direction of transport T, the smoking rail feed means 1 according to the present disclosure is provided after the hanger 5.

As has already been mentioned hereinbefore, the smoking rail feed means 1 serves to accurately feed the smoking rail 2 into the pick-up area A of the hanger 5 for picking up the sausage loops 11.

The smoking rail feed means 1 is implemented such that the smoking rail 2, when moving into the pick-up area A, is oriented in a defined, substantially horizontal plane. The height of the support 3, 3a, b is adapted to the height of the hooks 4 and the shape of the loops 11 so that the smoking rail 2 can be positioned on a suitable level in the loops 11. According to an advantageous embodiment, the height of the support 3 is vertically adjustable. The support 3 can be implemented as a large-area component so that more or less the whole smoking rail 2 will rest on the support 3. The support 3a, b may also be implemented as a multipoint support, as can be seen e.g. in FIG. 2. In said FIG. 2 the support 3 comprises two support elements 3a, b on which the smoking rail 2 rests. As will be explained in detail in the following, the support elements 3a, b are implemented as part of a smoking rail insertion unit 12 which, together with the smoking rail 2, can be moved out of the smoking rail feed means 1 and into the pick-up area A, as can also be seen from FIG. 4. In the present case, the smoking rail feed means 1 additionally comprises a driving element 9 in the form of a circulating driving belt 6 which drives the smoking rail insertion unit 12 and, consequently, the smoking rail 2 in the direction of arrow B and in a direction opposite thereto. The driving element 6 is driven via the motor 7 which is adapted to be controlled by a controller 8. As can especially be seen from FIGS. 2 and 4, the support 3a, b according to the embodiment shown in FIG. 2 is implemented as part of the smoking rail insertion unit 12 which, together with the smoking rail 2, is moved out of the smoking rail feed means 1 via the end of the housing 13 and into the pick-up area A. This embodiment allows a particularly stable and accurate introduction of the smoking rail 2 into the loops 11.

The structural design of the smoking rail insertion unit 12 will be explained hereinbelow in more detail in connection with FIG. 5 to 8.

Figure 7:
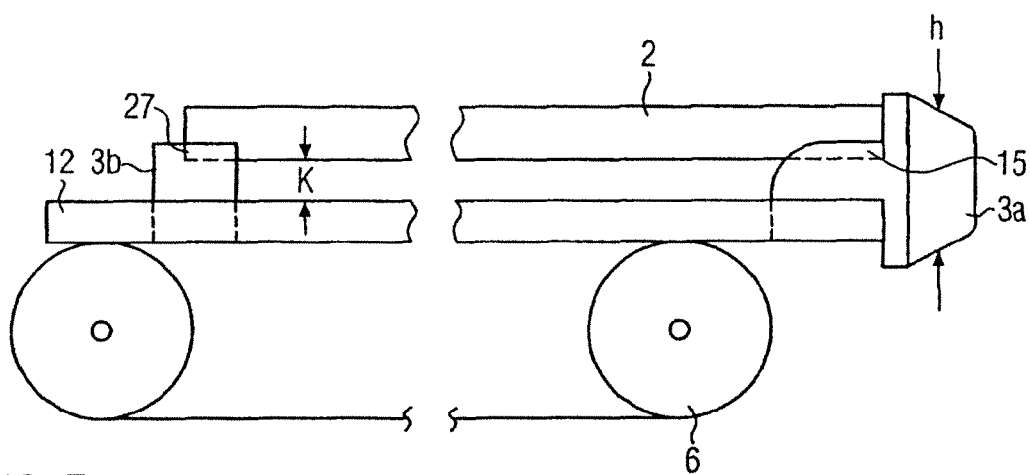
FIG. 7 shows, in a perspective view, a side view of a possible embodiment of the smoking rail feed means.

As can especially be seen from FIG. 7, which shows a side view of a part of the smoking rail feed means 1 according to the present disclosure, the smoking rail insertion unit 12 comprises a reception means 23 for the support elements 3a and 3b. The reception means 23 is e.g. U-shaped in this embodiment, the support elements 3a, b being simply inserted in said reception means 23.

Figure 8:
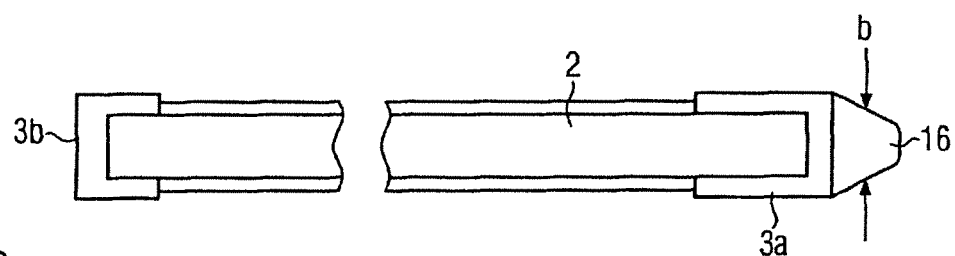
FIG. 8 shows a top view of the smoking rail feed means shown in FIG. 7.

As can be seen from FIG. 5 to 8, the front end 16 of the smoking rail insertion unit 12 is implemented as an integrated guide tip. In this embodiment, the support element 3a is implemented such that its front end 16, which faces the hanger 5, tapers. As indicated in FIG. 8, e.g. the width b of the guide tip tapers in the direction of the hanger 5. Furthermore, it is also possible that the height h tapers in the direction of the hanger 5 (cf. FIG. 7). A guide tip of this type allows the smoking rail insertion unit 12 to be threaded through the loops 11 in a particularly simple and careful manner. In view of the fact that the guide tip is not attached to the smoking rail 2, but is implemented as part of the smoking rail insertion unit 12, such a tip need not be attached to the smoking rail 2 in a time-consuming manner. Due to the fact that it is here the support 3, i.e. the front support element 3a, which is implemented as a guide tip, the latter can also be exchanged easily for different processes.

As can especially be seen from FIG. 5 to 8, the support 3, which is here the element 3a, is implemented such that the smoking rail 2 is encompassed by said support at least partially on its sides and at least partially on its front end 16, which faces the hanger. For this purpose, the support 3 is provided with a recess 15 (cf. FIG. 7), which has the smoking rail 2 inserted therein. This has the effect that the smoking rail 2 is secured against lateral displacement and against displacement to the front. By means of the recess 22 (FIG. 7) in the rear support element 3b, the smoking rail can also be secured against displacement to the rear.

Due to the fact that the support 3 is produced in the form of a replaceable element or consists of replaceable elements 3a b, the smoking rail feed means 1 can be adapted to different smoking rail shapes simply by exchanging the support 3, without any complicated retrofitting processes being necessary. In FIG. 5 to 8, the support 3 comprises two support elements 3a, b. The support 3 may, however, also comprise a plurality of support elements or it may be implemented as a large-area, integral support.

The smoking rail insertion unit 12, when moved through the drive means 6, is guided by a guide means 14, which is not shown in FIG. 5 to 8 for the sake of simplicity. A space K, which allows the smoking rail 2 to be unloaded, remains between the smoking rail 2 and the reception means 23.

Figure 9:
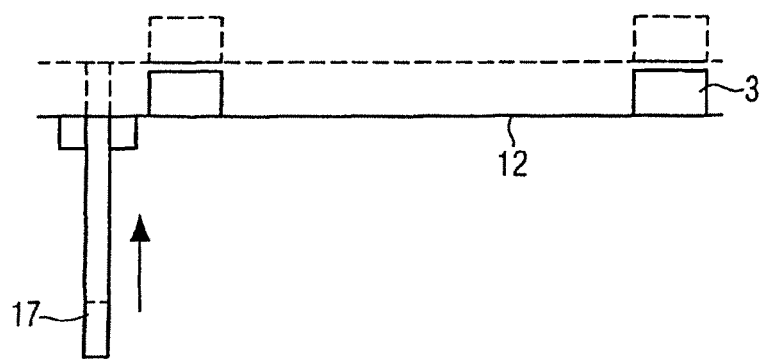
FIG. 9 shows very schematically a smoking rail insertion unit with a lifting means.

As indicated by FIG. 9, the smoking rail feed means 1 may comprise a lifting means 17, which moves the smoking rail insertion unit 12 in its transferred position upwards and/or to the side, i.e. in the direction of the suspension hooks 4, so as to simplify removal. The lifting means 17 can be applied e.g. laterally adjacent the drive means 6.

It will be advantageous to produce the support 3 from a plastic material.

The controller 8 can be configured such that it will synchronize the functions of the smoking rail feed means and the functions of the hanger 5.

The method according to the present disclosure will be explained hereinbelow in more detail in connection with the figures enclosed.

The smoking rail feed means 1 according to the present disclosure can be connected to a smoking-rail singulating and conveying system, which conveys the smoking rails 2 onto the support 3. The smoking rail 2 can, for example, be pushed from the rear in the direction of the hanger 5 over the support 3. By means of the recess 15, the smoking rail will be held and oriented in a suitable manner. It is, however, also possible to connect the smoking rail feed means 1 to a manually charged smoking rail bunker. Furthermore, it is also imaginable to integrate a smoking rail magazine, with or without smoking-rail singulation, in the smoking rail feed means 1.

According to a first embodiment of the present disclosure, the drive means 6 is driven by the motor 7 and moves the smoking rail 2, which rests on the support 3, into the pick-up area A of the hanger 5 to which sausage loops 11 have not yet been fed. According to the embodiment shown in FIG. 2 and FIG. 4, the smoking rail 2 is conveyed, together with the smoking rail insertion unit 12, into the pick-up area A. The sausage loops 11, which have been produced in the manner described hereinbefore, are taken over from the conveyor 19 in loops 11 by a transfer unit of the hanger 5 in the manner known and are guided across the positioned smoking rail 2 in the direction of transport T. When a predetermined number of loops 11 has been transported across the smoking rail 2, the smoking rail 2 will be raised and the laden smoking rail will be guided to a smoking rail rack. This can be done e.g. by means of two grippers of a handling system, which are not shown; these grippers take hold of the smoking rail 2 on the left and on the right lateral end portion thereof and transport it away. The gripper element can easily grip the smoking rail 2, since, below the supported smoking rail 2, a clearance K is formed, into which a gripper can easily be introduced.

When the laden smoking rail 2 has been removed, the support 3 can be moved away from the hanger 5 in the opposite direction and laden with a new smoking rail 2. A subsequent smoking rail 2 can already be introduced in the hanger 5 while the first-mentioned smoking rail 2 is still being transferred to the smoking rail rack. This can lead to a substantial increase in the process speed. A fast and automated insertion of the smoking rail 2 in the sausage loops 11 is made possible in this way. The hanger movement can take place in synchronism with the smoking rail movement and the movement of the grippers. The insertion tip allows a careful introduction of the smoking rail into the sausage loops 11. The handling time for the robot or the manipulator (not shown) can be reduced by decoupling the smoking rail insertion process from the robot.

Alternatively to the method shown hereinbefore, it is also possible that the hanger 5 first conveys the sausage loops 11, which are suspended from the hooks 4, into the pick-up area A and that the smoking rail feed means then threads the smoking rail 2 through the loops 11 by moving the support 3 into the pick-up area A.

The present disclosure has here been described in connection with sausages suspended in the form of loops. It goes without saying that the present disclosure is equally suitable for accurately threading rails through loops of other products, such as cheese, sweets, etc., suspended from a hanger.

The above embodiments have been explained in connection with sausage loops into which the smoking rail is inserted.

Figure 10:
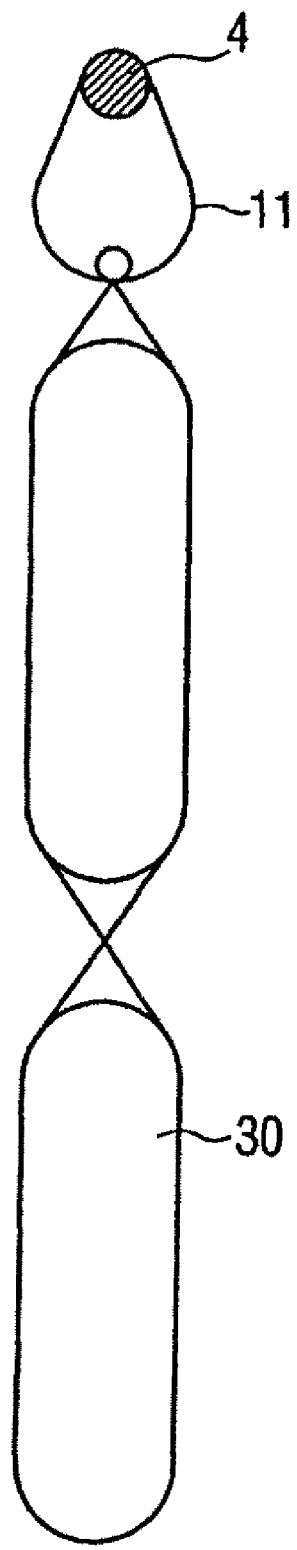
FIG. 10 shows sausages which are suspended from a loop.

As can be seen in FIG. 10, it is, however, also possible to suspend sausages 30 or other products from a loop 11, which has additionally been attached (e.g. clipped on by the clip module 20) as a suspension loop and which is suspended from the hooks 4; the smoking rail will then be inserted through the loops 11.

What is claimed is:

1. A smoking rail feed means for accurately positioning a smoking rail in sausage loops or in loops of other products suspended from a hanger, comprising a smoking rail support oriented in the direction of a hanger, a smoking rail resting, at least partially, on the smoking rail support, the smoking rail support being adapted to be displaced such that the smoking rail is transferred substantially in a longitudinal direction from a smoking rail feed means to a pick-up area of the hanger, in which the loops are arranged when they are being picked up, and wherein the smoking rail support being implemented as part of a smoking rail insertion unit which is adapted to be moved, together with the smoking rail, out of the smoking rail feed means and into the pick-up area.

2. A smoking rail feed means according to claim 1, wherein the smoking rail support is implemented as at least one replaceable support element in said smoking rail insertion unit.

3. A smoking rail feed means according to claim 1, wherein the front end of the smoking rail insertion unit is implemented as an integrated guide tip.

4. A smoking rail feed means according to claim 2 or 3, wherein the support element is implemented as an integrated guide tip.

5. A smoking rail feed means according to claim 1, wherein the smoking rail support is implemented such that the smoking rail is encompassed at least partially on its sides and at least partially on its front end, which faces the hanger.

6. A smoking rail feed means according to claim 1, wherein the smoking rail support and the smoking rail insertion unit, respectively, are moved by a motor-driven drive means.

7. A smoking rail feed means according to claim 1, wherein the smoking rail support and the smoking rail insertion unit, respectively, are adapted to be moved by hand.

8. A smoking rail feed means according to claim 1, wherein the smoking rail, when moving into the pick-up area, is oriented in a defined, substantially horizontal plane.

9. A smoking rail feed means according to claim 1, and additionally comprising a lifting means, which, in the transferred position of the smoking rail, one of raises the smoking rail, displaces it to the side, or a combination thereof.

10. A method of accurately feeding a smoking rail into sausage loops or into loops of other products suspended from a hanger, comprising
   positioning and orienting a smoking rail on a support of a smoking rail feed means, the support being implemented as part of a smoking rail insertion unit, and
   moving the smoking rail insertion unit substantially in the longitudinal direction of the smoking rail so that the smoking rail insertion unit, together with the smoking rail, will be introduced into the pick-up area of the hanger, in which the loops are arranged when they are being picked up.

11. A method according to claim 10, and conveying the suspended products into the pick-up area by the hanger, and one of either
   introducing the smoking rail, in a condition in which it rests on the support, into the loops which are already suspended in said pick-up area, or
   first moving the smoking rail, in a condition in which it rests on the support, into the pick-up area of the hanger and moving the loops then by the hanger across the smoking rail.

12. A method according to claim 10, and, as soon as the smoking rail has been positioned in the loops, raising the smoking rail, and one of guiding the laden smoking rail to a smoking rail rack /or displacing the smoking rail to the side.

13. A method according to claim 12, and, when the laden smoking rail has been removed, moving away the support from the hanger in the opposite direction and laden with a new smoking rail.

14. A method according to claims 10, and already introducing a subsequent smoking rail in the hanger, while the preceding smoking rail is still being transferred to the smoking rail rack.

15. A method according to claim 10, and synchronizing the movement of the support with the conveying movement of the hanger.

16. A method according to claim 10, and orienting the smoking rail, when moving into the pick-up area of the hanger, in a defined, substantially horizontal plane.

* * * * *